1,469,875

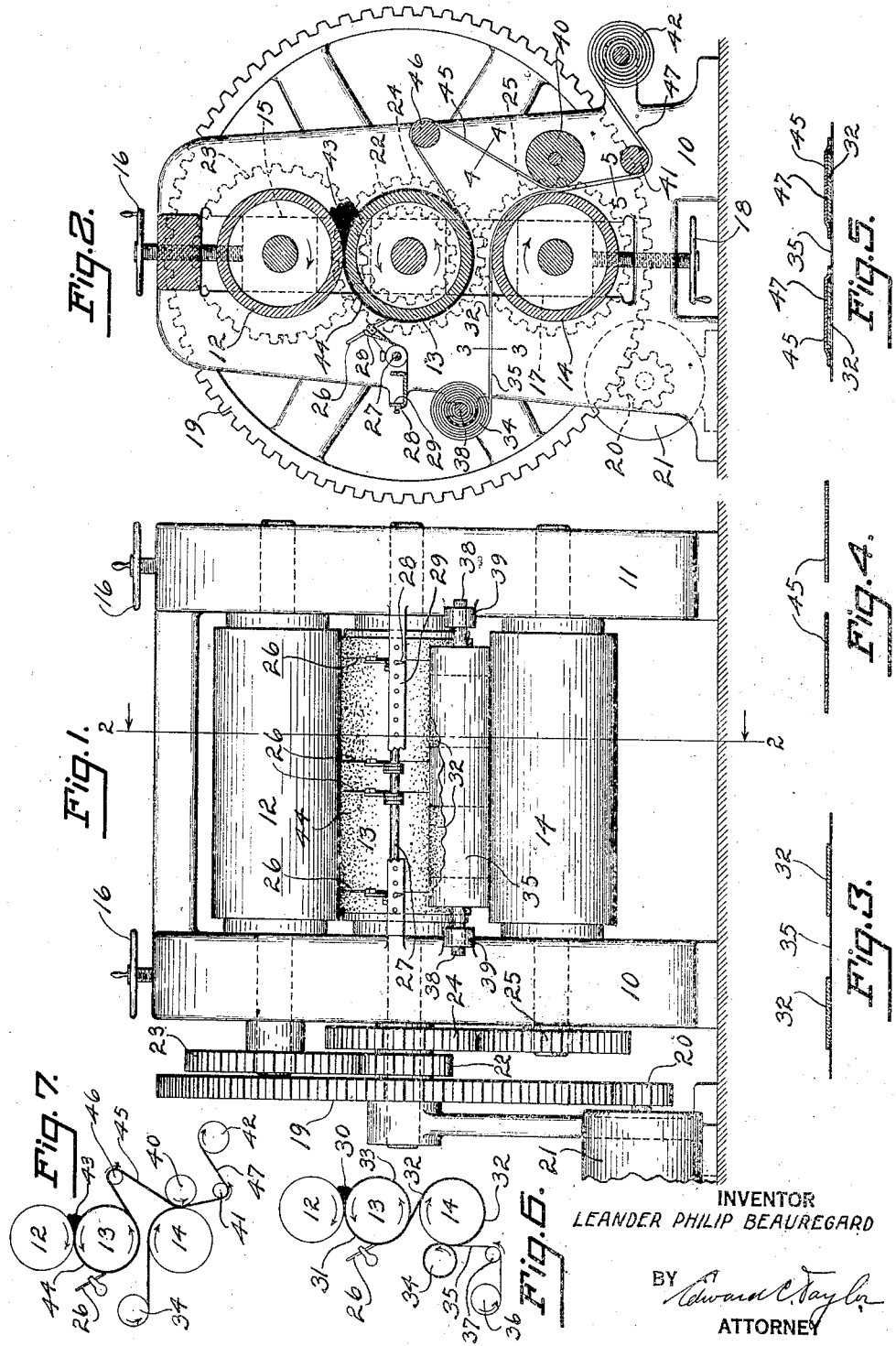
Oct. 9, 1923.
L. P. BEAUREGARD
CALENDERING RUBBER
Filed Aug. 11, 1921
1,469,875
INVENTOR
LEANDER PHILIP BEAUREGARD
BY *Edward C Taylor*
ATTORNEY Patented Oct. 9, 1923.

UNITED STATES PATENT OFFICE.

LEANDER PHILIP BEAUREGARD, OF CHICOPEE, MASSACHUSETTS, ASSIGNOR TO THE FISK RUBBER COMPANY, OF CHICOPEE FALLS, MASSACHUSETTS, A CORPORATION OF MASSACHUSETTS.

CALENDERING RUBBER.

Application filed August 11, 1921. Serial No. 491,439.

*To all whom it may concern:*

Be it known that I, LEANDER PHILIP BEAUREGARD, a citizen of the United States of America, residing at Chicopee, in the county of Hampden and State of Massachusetts, have invented certain new and useful Improvements in Calendering Rubber, of which the following is a specification.

My invention relates to the calendering of rubber in sheet form, and has among other objects the efficient production of multi-ply rubber sheeting in which the edges of the sheet are thinned down by the overlapping of one ply over the other.

It is desirable in certain manufacturing operations to use sheet rubber having thinned-down edge portions. In operations for which such sheets are used it is frequently of importance to secure accurate control of the registry of the different plies forming the multi-ply sheet. It is to this control, as well as to the production of stepped off multi-ply stock in a generally expeditious manner, that my present invention is principally directed.

I will now describe one embodiment of the invention in connection with the accompanying drawings, in which—

Fig. 1 is a front view of a calender by means of which the invention may be practiced;

Fig. 2 is a section on line 2—2 of Fig. 1;
Fig. 3 is a section on line 3—3 of Fig. 2;
Fig. 4 is a section on line 4—4 of Fig. 2;
Fig. 5 is a section on line 5—5 of Fig. 2;
Fig. 6 is a diagrammatic view showing how the stock may be handled during the formation of the first ply; and Fig. 7 is a similar view showing how the stock may be handled during the addition of a second ply to the first ply so formed.

In practicing the invention a calender of the usual type may be employed. Such a calender embodies frame standards 10 and 11 on which are journaled rolls 12, 13, and 14, roll 12 being adjustable towards and away from the middle roll 13 by slidable journal boxes 15 controlled as by hand wheels 16. The bottom roll 14 is likewise mounted in slidable journal boxes 17 controlled as by hand wheels 18. Roll 13 is driven as by a gear 19 fast to its shaft from a pinion 20 rotated by any suitable source of power as an electric motor 21. Rolls 13 and 12 are coupled together by gears 22 and 23 so that the upper roll 12 will have a peripheral speed about two-thirds that of the middle roll 12. Rolls 13 and 14 are connected by gears 24 and 25 of equal diameters so that the rolls will have the same peripheral speed. Knives 26 are adjustable along a knife bar 27 and are held pressed against roll 13 as by elastic bands 28 passed around the knives, under the knife bar, and over pins on a channel 29.

With a calender so arranged the invention is practiced according to the form illustrated by preparing a sheet of narrow width stock and rolling up the sheeted stock with a liner or separating sheet of material which will prevent adjacent layers of the stock from sticking to each other, and then forming a sheet of wider stock and pressing this upon the first formed narrow stock while the latter is supported by the liner. In the drawings Fig. 6 represents the calender arranged for the production of the first ply of stock, while Figs. 1, 2, and 7 represent the formation of the multi-ply sheet. In the drawings the formation of two similar parallel two-ply sheets has been illustrated.

The first ply is formed by sheeting rubber from a feed or bank 30 between rolls 12 and 13 to form a sheet 31 which is severed by knives 26 to the width desired for the first ply 32. The cut stock is led around the bottom roll 14, while the excess stock 33 from sheet 31 travels around the middle roll and rejoins the feed 30. The strip 32 is wound upon a reel 34 together with a liner 35 led from a spool 36 over a guide roll 37. These various rolls, reels and spools have been indicated diagrammatically only in Fig. 7, as the specific means by which they are supported is within the province of any one skilled in the art of operating calenders.

The reel 34, with the liner 35 and strip 32 rolled upon it is then mounted as shown in Figs. 1, 2 and 7 so that the liner and stock may be fed between the two lower rolls of a calender. In order to obtain ease in control of the lateral position of the strip 32 the reel 34 is preferably mounted upon an arbor 38 journaled on the calender frames in boxes 39 so that it may be rotated and may also be moved axially. If additional refinement is desired the arbor may be fitted with a suitable axial adjusting means, but in most cases manual control of the arbor will be found sufficient. Of course, if desired, the reel 34 may be mounted for movement on the arbor instead of the arbor being movable on the frame. The stock and liner are led over roll 14, between that roll and a pressure roll 40, around a guide 41, and are wound upon a reel 42.

The second ply of stock is sheeted between rolls 12 and 13 from a feed 43, forming a wide sheet 44 which is cut by knives 26 to the desired width strip 45. This strip is led over a guide 46, while the excess stock goes around roll 13 back into the bank 43. The cut strip 45 meets the first ply 32 between rolls 14 and 40, as indicated by Fig. 5, and is united thereto to form the two-ply strip 47 indicated by rolling contact. As shown in Fig. 5 the width to which the strip 45 is cut is greater than the width of strips 32, so that the wider strip will extend over the edges of the narrow one to produce the stepped off edges previously referred to. This enables the second ply to be readily adjusted laterally, the edges of both plies being visible to an operator, as apparent from Fig. 1.

Among the advantages which this process possesses is the ease of registry of the first and second plies whether or not the widths of the plies is such as to produce a stepped off condition. The second ply, being in process of formation on the calender, maintains itself in position without serious trouble. The first ply, being attached to a relatively stiff and manageable liner is held by the latter in position. If any irregularities in lateral position of the first ply strip occur during its formation, the first ply strip can readily be adjusted during the application of the second ply thereto by shifting reel 34 axially. Further advantages are found when the calender is sufficiently wide to enable a plurality of strips being run simultaneously. The liner not only aids in adjusting both strips together into registering position, but holds the several strips in their proper spaced relation.

Having thus described my invention, I claim:

1. A method of preparing two ply rubber stock consisting in forming a rubber strip, rolling up the strip on a liner, forming between two rolls of a calender a second rubber strip, directing the first rubber strip together with its liner into rolling contact with the second strip, and preserving the alignment of the two strips by controlling the liner.

2. A method of preparing two-ply rubber stock having stepped-off edges consisting in forming a rubber strip, rolling up the strip on a liner, forming between two rolls of a calender a second strip wider than the first, leading the first strip with its liner over a third roll of the calender, pressing the second strip against the first strip while supported by its liner and the said third roll, and preserving the alignment of the two strips by controlling the liner.

3. A method of preparing two-ply rubber stock consisting in forming a plurality of rubber strips, rolling up the strips in parallel relation on single liner, forming between two rolls of a calender a second series of strips in parallel relation, leading the liner with the first strips thereon over a third roll of the calender, pressing the second strips against the first strips by rolling contact while the latter are supported by the liner and the said third roll, and preserving the aligment of the two series of strips by controlling the liner.

4. A method of preparing two-ply rubber stock having stepped-off edges consisting in forming a plurality of rubber strips, rolling up the strips in parallel relation on a single liner, forming between two rolls of a calender a second series of strips wider than the first, leading the liner with the first strips thereon over a third roll of the calender, pressing the second strips against the first strips by rolling contact while the latter are supported by the liner and the said third roll, and preserving the alignment of the two series of strips by controlling the liner.

LEANDER PHILIP BEAUREGARD.